US009967409B2

(12) United States Patent
Oguma

(10) Patent No.: US 9,967,409 B2
(45) Date of Patent: May 8, 2018

(54) IMAGE FORMING APPARATUS THAT ACHIEVES PULL PRINT WITHOUT USING SERVER COMPUTER, AND IMAGE FORMING SYSTEM AND RECORDING MEDIUM

(71) Applicant: Kyocera Document Solutions Inc., Osaka (JP)

(72) Inventor: Takashi Oguma, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 14/918,603

(22) Filed: Oct. 21, 2015

(65) Prior Publication Data

US 2016/0112583 A1  Apr. 21, 2016

(30) Foreign Application Priority Data

Oct. 21, 2014  (JP) .................. 2014-214893

(51) Int. Cl.
  *H04N 1/00* (2006.01)
  *G06K 15/02* (2006.01)
  *G06F 3/12* (2006.01)

(52) U.S. Cl.
  CPC ......... *H04N 1/0023* (2013.01); *G06F 3/1203* (2013.01); *G06F 3/1222* (2013.01); *G06F 3/1261* (2013.01); *G06F 3/1267* (2013.01); *G06F 3/1288* (2013.01); *G06F 3/1291* (2013.01); *G06F 3/1293* (2013.01); *G06K 15/1806* (2013.01); *G06K 15/1818* (2013.01); *H04N 1/00244* (2013.01); *H04N 1/00347* (2013.01); *G06F 3/122* (2013.01); *G06F 3/126* (2013.01); *H04N 2201/0094* (2013.01)

(58) Field of Classification Search
  CPC ..................... H04N 1/0023; H04N 1/00228
  See application file for complete search history.

(56) References Cited

U.S. PATENT DOCUMENTS

| 2002/0114004 A1* | 8/2002 | Ferlitsch | G06F 3/1203 358/1.15 |
| 2004/0158654 A1* | 8/2004 | Shima | H04N 1/32545 710/8 |

(Continued)

FOREIGN PATENT DOCUMENTS

| JP | 2004-362330 A | 12/2004 |
| JP | 2011-003056 A | 1/2011 |

*Primary Examiner* — Nicholas Pachol
(74) *Attorney, Agent, or Firm* — James Judge

(57) ABSTRACT

An image forming apparatus includes a print device, a communication device, a print executing circuit, a job managing circuit, and an another-apparatus transmitting circuit. The print device executes print on a recording medium. The communication device performs communications. The print executing circuit causes the print device to perform a print job addressing a first port number received by the communication device. The job managing circuit manages a print job addressing a second port number received by the communication device. The second port number is different from the first port number. The another-apparatus transmitting circuit transmits the print job managed by the job managing circuit to another image forming apparatus upon request from the other image forming apparatus via the communication device.

2 Claims, 15 Drawing Sheets

(56) References Cited

U.S. PATENT DOCUMENTS

| | | | |
|---|---|---|---|
| 2005/0018240 A1 | 1/2005 | Shima et al. | |
| 2005/0134909 A1* | 6/2005 | Shima | H04N 1/00278 358/1.15 |
| 2005/0270565 A1* | 12/2005 | Shima | H04N 1/00915 358/1.15 |
| 2005/0280861 A1* | 12/2005 | Shima | H04N 1/00954 358/1.15 |
| 2006/0250643 A1* | 11/2006 | Matsumoto | G06F 3/1204 358/1.15 |
| 2006/0256373 A1* | 11/2006 | Matsumoto | G06F 3/1204 358/1.15 |
| 2006/0274370 A1* | 12/2006 | Shima | G06F 3/1204 358/1.15 |
| 2007/0046989 A1* | 3/2007 | Shima | G06F 3/1208 358/1.15 |
| 2007/0273922 A1* | 11/2007 | Matsugashita | G06F 3/1207 358/1.15 |
| 2008/0123130 A1* | 5/2008 | Matsumoto | G06F 3/1207 358/1.15 |
| 2012/0212760 A1* | 8/2012 | Sakura | G06F 3/1204 358/1.13 |
| 2013/0003125 A1 | 1/2013 | Morii | |
| 2013/0120784 A1* | 5/2013 | Takagi | G06F 3/1288 358/1.14 |
| 2016/0070511 A1* | 3/2016 | Nishida | G06F 3/1288 358/1.14 |

* cited by examiner

IMAGE FORMING APPARATUS THAT ACHIEVES PULL PRINT WITHOUT USING SERVER COMPUTER, AND IMAGE FORMING SYSTEM AND RECORDING MEDIUM

INCORPORATION BY REFERENCE

This application is based upon, and claims the benefit of priority from, corresponding Japanese Patent Application No. 2014-214893 filed in the Japan Patent Office on Oct. 21, 2014, the entire contents of which are incorporated herein by reference.

BACKGROUND

Unless otherwise indicated herein, the description in this section is not prior art to the claims in this application and is not admitted to be prior art by inclusion in this section.

The following system has been known as an image forming system to achieve pull print. This image forming system transmits a print job from a user's computer to a server computer to cause the server computer to store the print job. Then, when the user logs in to any given image forming apparatus, the server computer transmits the print job for the user to the image forming apparatus. The image forming apparatus executes the transmitted print job.

SUMMARY

An image forming apparatus according to one aspect of the disclosure includes a print device, a communication device, a print executing circuit, a job managing circuit, and an another-apparatus transmitting circuit. The print device executes print on a recording medium. The communication device performs communications. The print executing circuit causes the print device to perform a print job addressing a first port number received by the communication device. The job managing circuit manages a print job addressing a second port number received by the communication device. The second port number is different from the first port number. The another-apparatus transmitting circuit transmits the print job managed by the job managing circuit to another image forming apparatus upon request from the other image forming apparatus via the communication device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
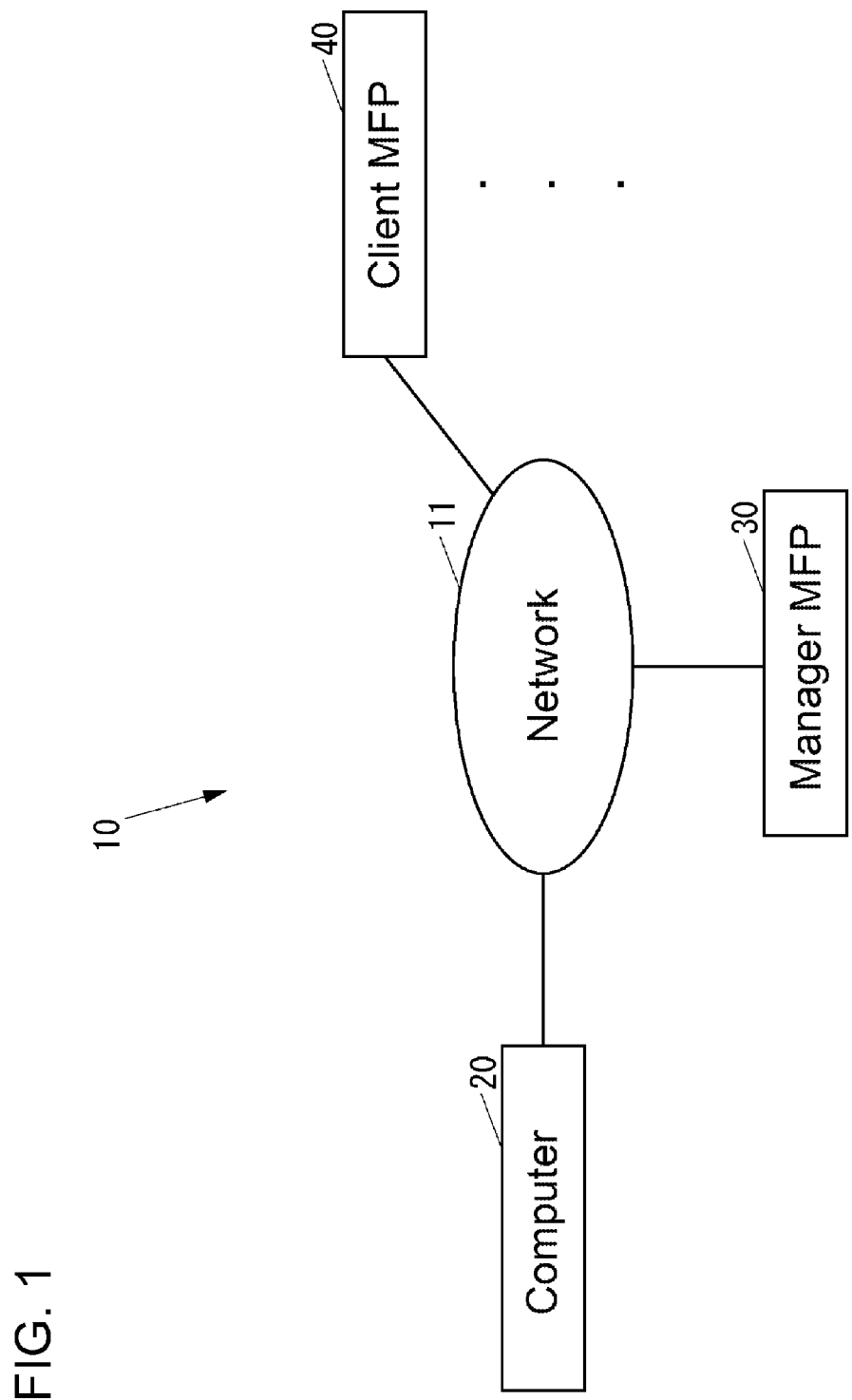
FIG. 1 illustrates an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of an image forming system according to the embodiment.

FIG. 1 illustrates an image forming system 10 according to this embodiment.

As illustrated in FIG. 1, the image forming system 10 includes a computer 20, a manager MFP 30, and a plurality of client MFPs such as a client MFP 40. The computer 20 transmits print jobs. The manager MFP 30 is a multifunction peripheral (MFP) that can manage the print jobs transmitted by the computer 20. The client MFP 40 is an MFP that can execute the print jobs managed by the manager MFP 30. The computer 20 and the client MFPs such as the manager MFP 30 and the client MFP 40 are communicatively connected to one another via a network 11 such as a local area network (LAN) and the Internet.

Since the client MFP other than the client MFP 40 is similar to the client MFP 40, the following omits the description.

Figure 2:
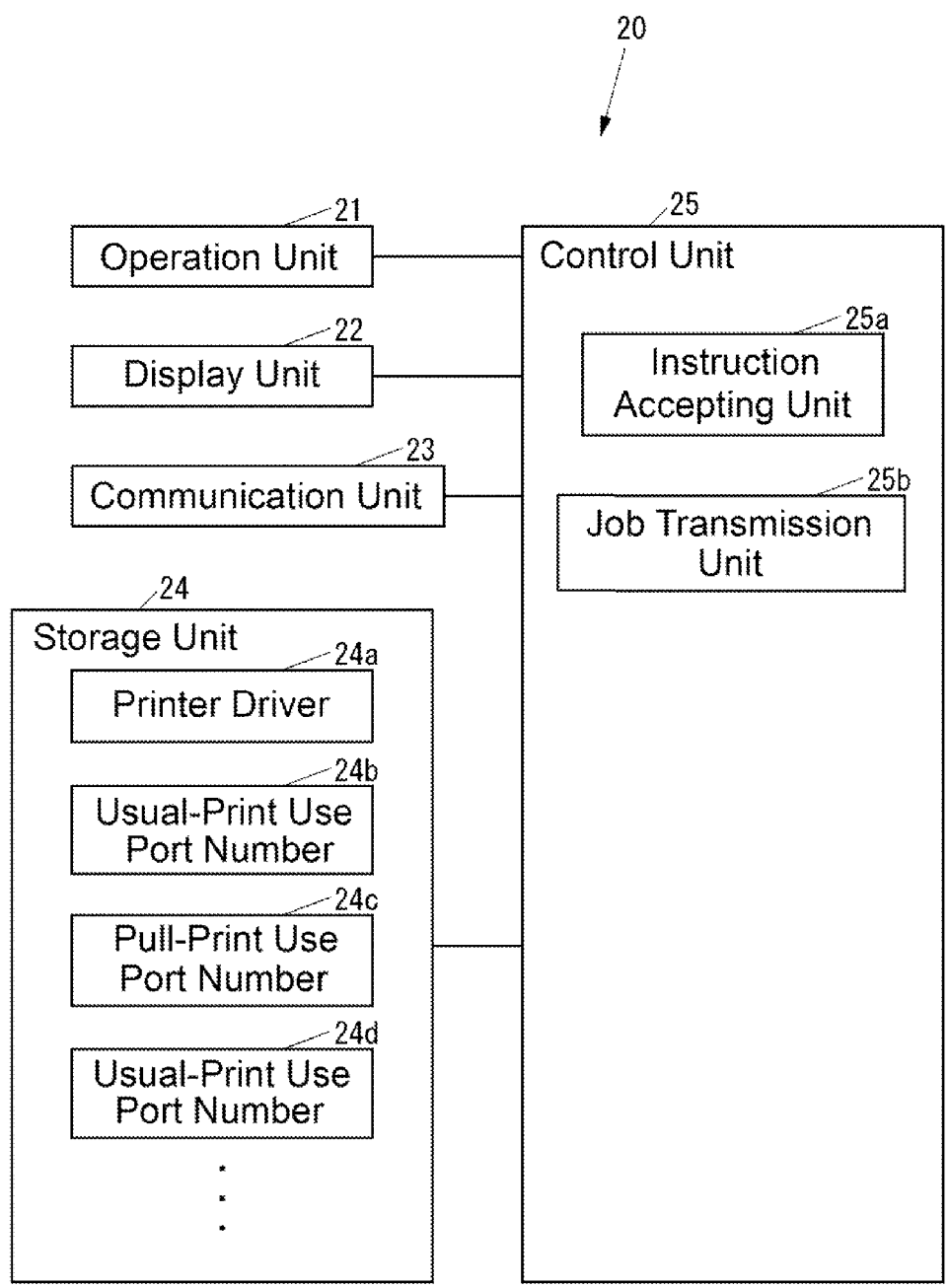
FIG. 2 illustrates a computer according to the one embodiment.

FIG. 2 illustrates the computer 20.

As illustrated in FIG. 2, the computer 20 includes an operation unit 21, a display unit 22, a communication unit 23, a storage unit 24, and a control unit 25. The operation unit 21 is an input device, such as a computer mouse and a keyboard, to which various operations are input. The display unit 22 is a display device such as a liquid crystal display (LCD) that displays various pieces of information. The communication unit 23 is a communication device that communicates with an external device, such as an MFP, via the network 11 (see FIG. 1). The storage unit 24 is a storage device, such as a hard disk drive (HDD), which stores programs and various data. The control unit 25 controls the entire computer 20. The computer 20 is constituted of an electronic device such as a personal computer (PC).

The storage unit 24 stores a printer driver 24a to control the MFP from the computer 20. The printer driver 24a may have been installed on the computer 20 at the production stage of the computer 20. The printer driver 24a may be additionally installed from a storage medium such as a compact disk (CD), a digital versatile disk (DVD), and a universal serial bus (USB) memory on the computer 20. The printer driver 24a may also be additionally installed on the computer 20 over the network 11.

The storage unit 24 can store a port number for usual-print (hereinafter referred to as a "usual-print use port number") 24b as a first port number of the manager MFP 30 (see FIG. 1). The storage unit 24 can also store a port number for pull print (hereinafter referred to as a "pull-print use port number") 24c as a second port number of the manager MFP 30. The storage unit 24 can also store usual-print use port numbers 24d for the plurality of respective client MFPs such as the client MFPs 40 (see FIG. 1).

The control unit 25 includes, for example, a central processing unit (CPU), a read only memory (ROM), and a random access memory (RAM). The ROM preliminarily stores programs and various data. The RAM is used as a work area of the CPU. The CPU executes the program stored in the ROM or the storage unit 24, which is a non-transitory computer-readable recording medium.

The control unit 25 functions as an instruction accepting unit 25a and a job transmission unit 25b. The instruction accepting unit 25a accepts an instruction upon execution of the printer driver 24a stored in the storage unit 24. The job transmission unit 25b transmits the print job to the MFP according to the instruction accepted by the instruction accepting unit 25a.

Figure 3:
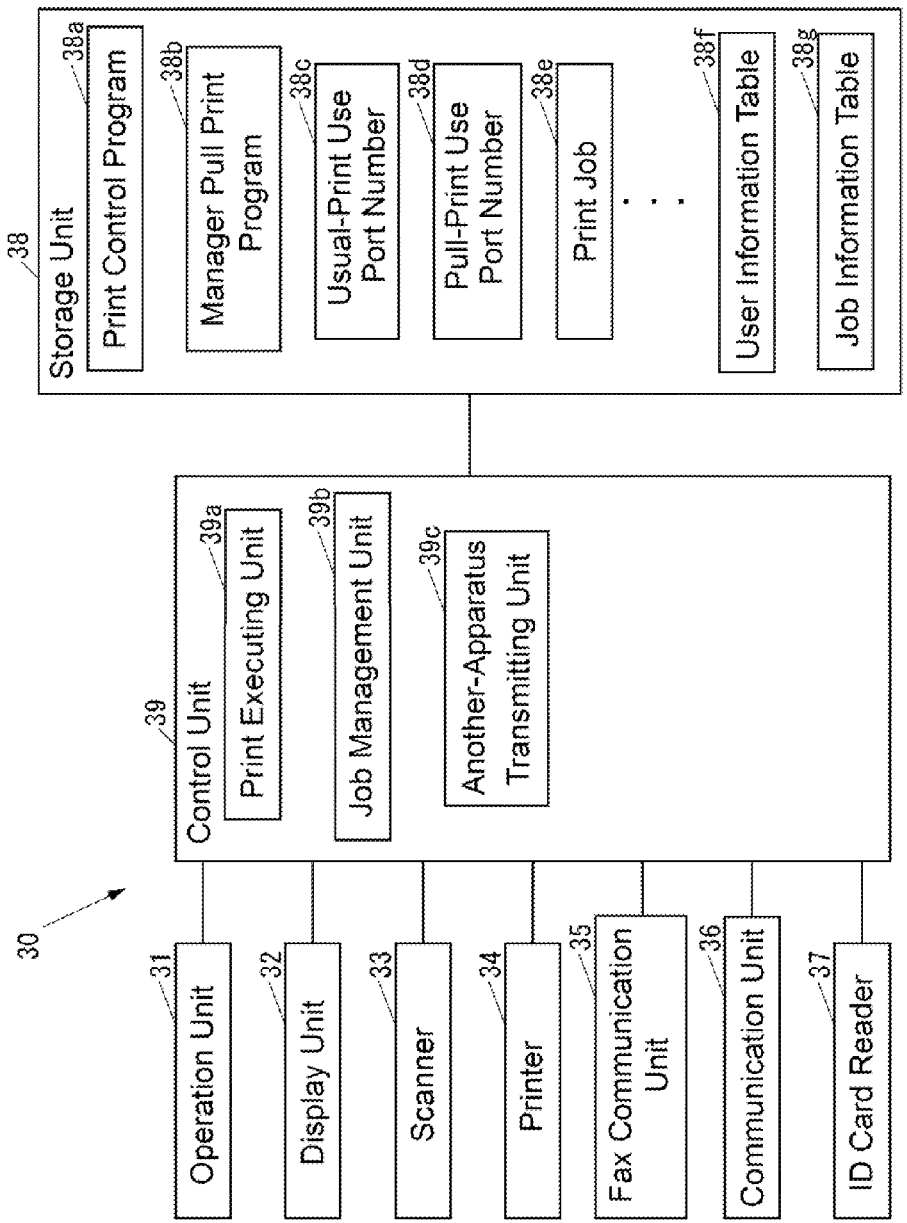
FIG. 3 illustrates a manager MFP according to the one embodiment.

FIG. 3 illustrates the manager MFP 30.

As illustrated in FIG. 3, the manager MFP 30 includes an operation unit 31, a display unit 32, a scanner 33, a printer 34, a fax communication unit 35, a communication unit 36, an ID card reader 37, a storage unit 38, and a control unit 39. The operation unit 31 is an input device such as a button to which various operations are input. The display unit 32 is a display device such as an LCD, which displays various pieces of information. The scanner 33 is a reading device that reads an image from a document. The printer 34 is a print device that executes a print on a recording medium such as a paper sheet. The fax communication unit 35 is a fax device that performs fax communications with an external facsimile device (not illustrated) via a communication line such as a dial-up line. The communication unit 36 is a communication device that communicates with an external device, such as the computer 20 (see FIG. 1), via the network 11 (see FIG. 1). The ID card reader 37 is a card reading device to read ID card information from the ID card. The storage unit 38 is a storage device such as an electrically erasable programmable read only memory (EEPROM) and a HDD, which stores various data. The control unit 39 controls the entire manager MFP 30.

The storage unit 38 stores a print control program 38a and a manager pull print program 38b. The print control program 38a controls the execution of the print job. The manager pull print program 38b as a job management program controls the pull print. The print control program 38a and the manager pull print program 38b may have been installed on the manager MFP 30 at the production stage of the manager MFP 30. The print control program 38a and the manager pull print program 38b also may be additionally installed from a storage medium such as an SD card and the universal serial bus (USB) memory on the manager MFP 30 or may be additionally installed on the manager MFP 30 over the network 11.

The storage unit 38 can store a usual-print use port number 38c and a pull-print use port number 38d. The usual-print use port number 38c and the pull-print use port number 38d are port numbers different from one another. For example, a manager of the manager MFP 30 can set any given number to the usual-print use port number 38c and the pull-print use port number 38d. For example, the usual-print use port number 38c and the pull-print use port number 38d are "9100" and "39100," respectively.

The storage unit 38 can store a plurality of print jobs 38e transmitted from the computer 20.

The storage unit 38 can store a user information table 38f and a job information table 38g. The user information table 38f manages information on the users. The job information table 38g manages information on the print jobs.

Figure 4:
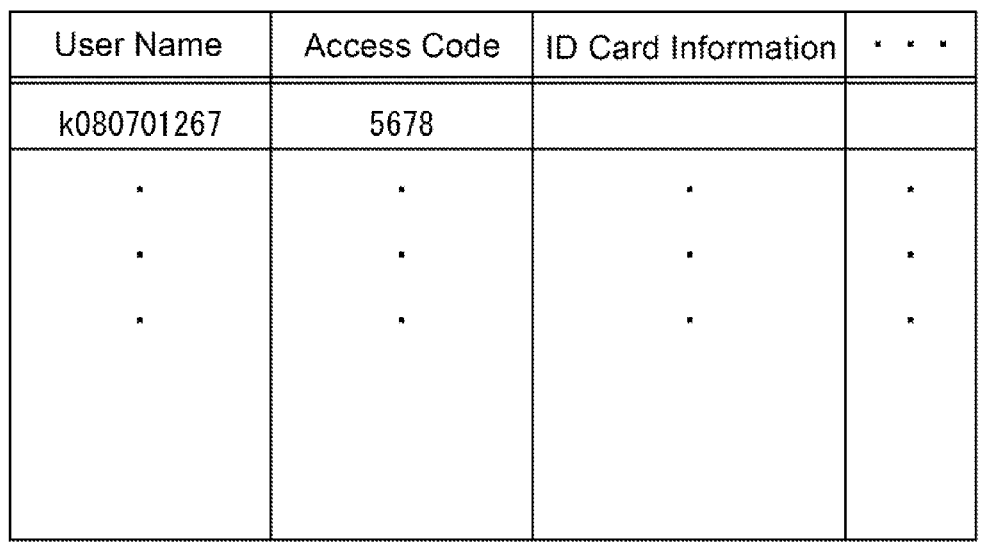
FIG. 4 illustrates one example of a user information table according to the one embodiment.

FIG. 4 illustrates one example of the user information table 38f.

As illustrated in FIG. 4, the user information table 38f includes a user name indicative of identification information of the user, an access code indicative of authentication information of the user, and ID card information on the ID card of the user, for each user. For example, in the example illustrated in FIG. 4, the access code of the user with the user name "k080701267" is "5678."

Figure 5:
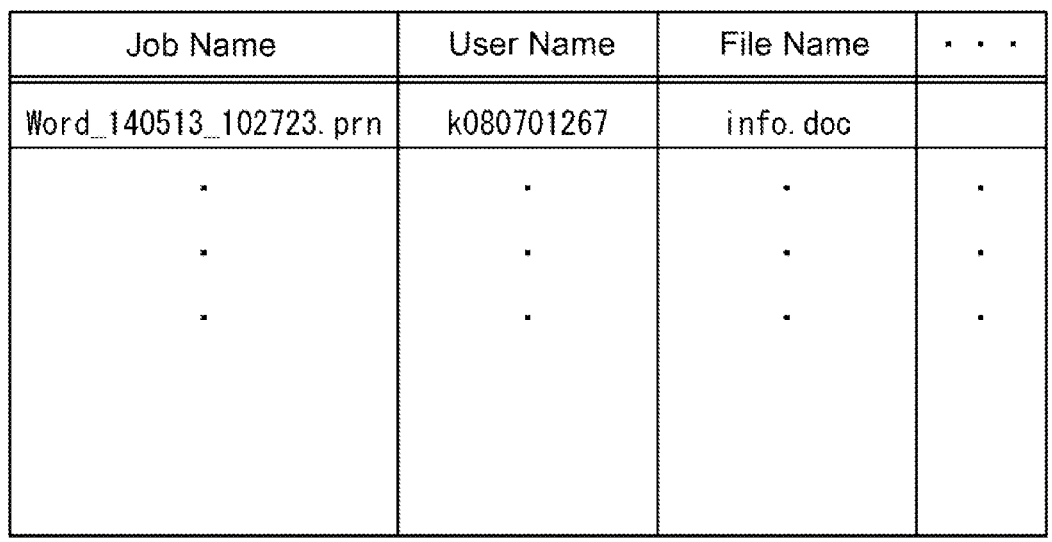
FIG. 5 illustrates one example of a job information table according to the one embodiment.

FIG. 5 illustrates one example of the job information table 38g.

As illustrated in FIG. 5, the job information table 38g includes a job name indicative of the name of the print job, the user name associated with the print job, and a file name of the print job for each print job. For example, in the example illustrated in FIG. 5, the user name associated with the print job with the job name "Word_140513_102723.prn" and the file name are "k080701267" and "info.doc," respectively.

The control unit 39, which is illustrated in FIG. 3, for example, includes the CPU, the ROM, which stores programs and various data, and the RAM as a main storage device, which is used as the work area for CPU. The CPU executes the programs stored in the ROM or the storage unit 38.

The control unit 39 executes the print control program 38a stored in the storage unit 38 to cause the printer 34 to execute a print job addressing the usual-print use port number 38c received by the communication unit 36. Thus, the control unit 39 functions as a print executing unit 39a (which is also referred to as print executing circuit).

By execution of the manager pull print program 38b stored in the storage unit 38, the control unit 39 functions as a job management unit 39b and an another-apparatus transmitting unit 39c. The job management unit 39b (which is also referred to as job management circuit) manages the print job addressing the pull-print use port number 38d and received by the communication unit 36. The another-apparatus transmitting unit 39c (which is also referred to as another-apparatus transmitting circuit) transmits the print job managed by the job management unit 39*b* to the client MFP 40 via the communication unit 36 upon request from the client MFP 40.

Figure 6:
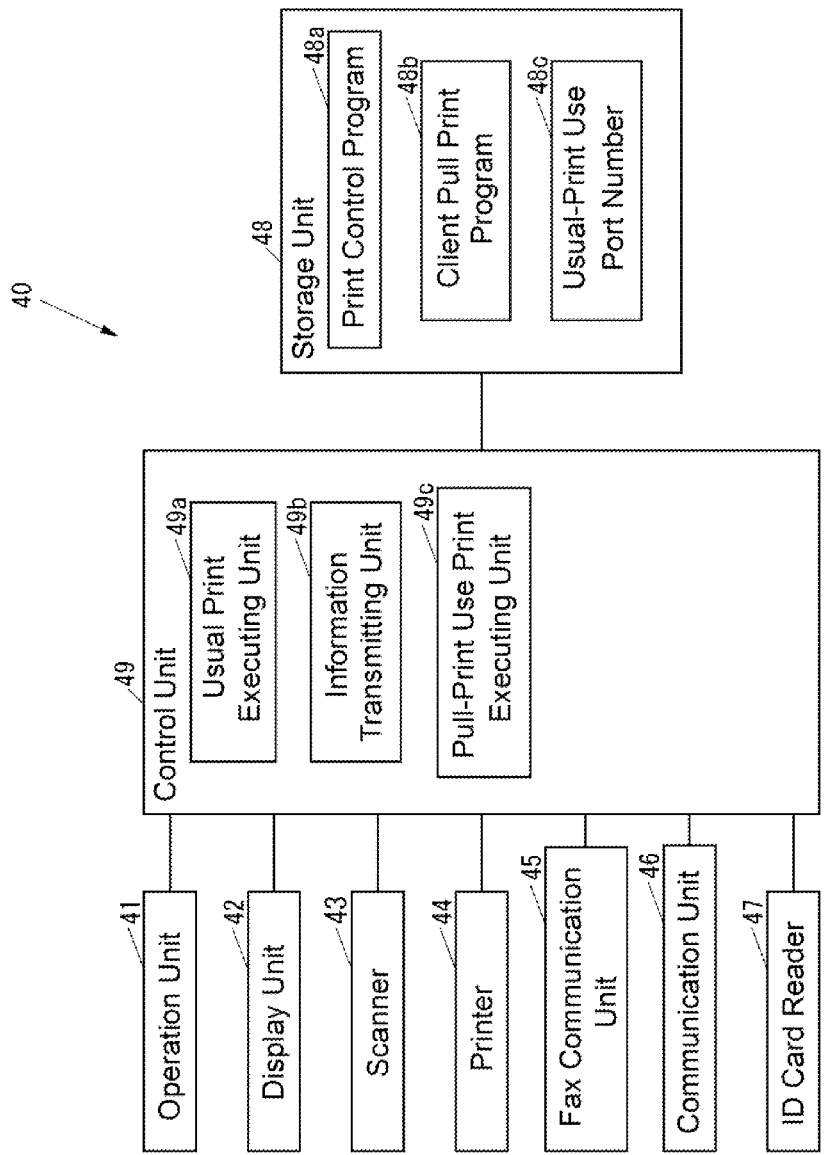
FIG. 6 illustrates a client MFP according to the one embodiment.

FIG. 6 illustrates the client MFP 40.

As illustrated in FIG. 6, similar to the manager MFP 30 (see FIG. 3), the client MFP 40 includes an operation unit 41, a display unit 42, a scanner 43, a printer 44, a fax communication unit 45, a communication unit 46, an ID card reader 47, a storage unit 48, and a control unit 49.

The storage unit 48 stores a print control program 48*a* and a client pull print program 48*b*. The print control program 48*a* controls the execution of the print job. The client pull print program 48*b* controls the pull print. The print control program 48*a* and the client pull print program 48*b* may have been installed on the client MFP 40 at the production stage of the client MFP 40. The print control program 48*a* and the client pull print program 48*b* may be additionally installed from the storage medium such as the SD card and a USB memory on the client MFP 40, or may also be additionally installed on the client MFP 40 over the network 11 (see FIG. 1).

The storage unit 48 can store the usual-print use port number 48*c*. For example, the manager of the client MFP 40 can set any given number to the usual-print use port number 48*c*. For example, a usual-print use port number 48*c* is "9100."

The control unit 49 executes the print control program 48*a* stored in the storage unit 48 to cause the printer 44 to execute the print job addressing the usual-print use port number 48*c* received by the communication unit 46. Thus, the control unit 49 functions as a usual print executing unit 49*a*.

The control unit 49 executes the client pull print program 48*b* stored in the storage unit 48 to function as an information transmitting unit 49*b*, which transmits information to the manager MFP 30, and a pull-print use print executing unit 49*c*, which cause the printer 44 to execute the print jobs received from the manager MFP 30.

The following describes the operations of the image forming system 10.

First, the following describes the setting of the port number with the printer driver 24*a*.

The user can instruct the computer 20 to start setting the pull-print use port number of the manager MFP 30 via the operation unit 21 of the computer 20. When the start of the setting of the pull-print use port number of the manager MFP 30 is instructed, the instruction accepting unit 25*a* of the computer 20 displays a setting screen 50, which is illustrated in FIG. 7, on the display unit 22.

Figure 7:
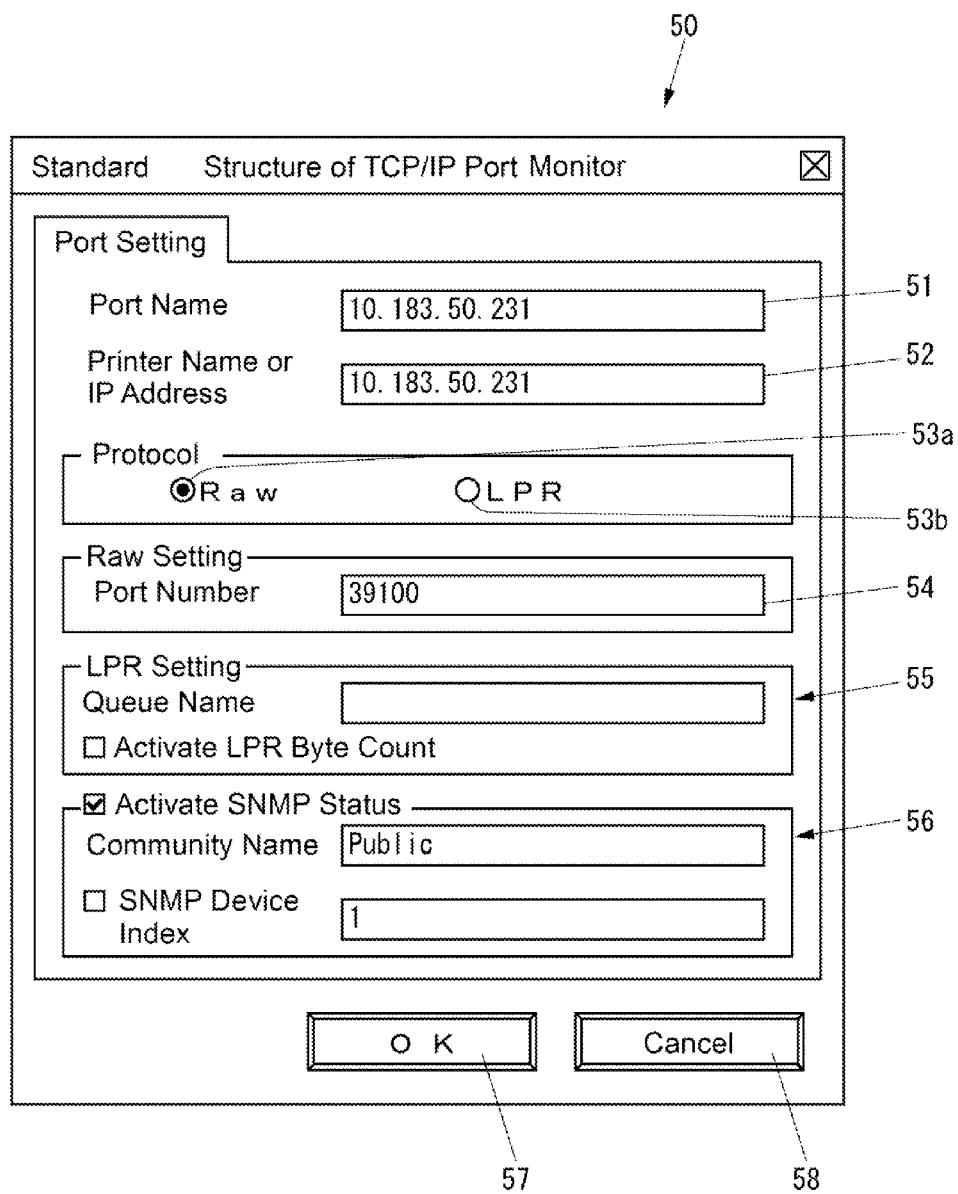
FIG. 7 illustrates one example of a setting screen for a port number with a printer driver according to the one embodiment.

FIG. 7 illustrates one example of the setting screen 50 for the port number with the printer driver 24*a*.

The setting screen 50 illustrated in FIG. 7 includes a text box 51, a text box 52, a radio button 53*a*, a radio button 53*b*, a text box 54, a setting area 55, a setting area 56, an OK button 57, and a cancel button 58. To the text box 51, a name of a setting-target port is input. To the text box 52, a name of a setting-target MFP or an Internet protocol (IP) address is input. The radio button 53*a* is to select Raw as a communication protocol with the setting-target MFP. The radio button 53*b* is to select a line printer daemon protocol (LPR) as the communication protocol with the setting-target MFP. To the text box 54, a port number of the setting-target MFP used for communications in the Raw protocol is input. The setting area 55 is a setting area for communications with the setting-target MFP in LPR. The setting area 56 is a setting area regarding simple network management protocol (SNMP). The OK button 57 is a button to activate the settings. The cancel button 58 is a button to cancel the settings. The radio button 53*a* and the radio button 53*b* are always in a state where only any one of them is selected.

The user inputs the IP address of the manager MFP 30 to the text box 52 on the setting screen 50 and selects the radio button 53*a*. As the pull-print use port number of the manager MFP 30, the user inputs, for example, the port number notified from the manager of the manager MFP 30 to the text box 54 and presses the OK button 57. Thus, the printer driver 24*a* can instruct the setting of the pull-print use port number of the manager MFP 30.

When the printer driver 24*a* instructs the instruction accepting unit 25*a* to set the pull-print use port number of the manager MFP 30, the instruction accepting unit 25*a* stores the port number specified in the text box 54 in the storage unit 24 as the pull-print use port number 24*c*.

The setting of the pull-print use port number of the manager MFP 30 with the printer driver 24*a* is described above. The same applies to the setting of the usual-print use port number of the manager MFP 30 with the printer driver 24*a* and the setting of the usual-print use port number of the client MFP with the printer driver 24*a*.

The following describes the operations of the image forming system 10 for usual print.

The user can input an instruction to cause the manager MFP 30 to execute print according to various settings such as the number of print copies, page aggregation, and duplex printing to the computer 20 via the operation unit 21 of the computer 20. When the instruction to cause the manager MFP 30 to execute print is input to the computer 20, the instruction accepting unit 25*a* of the computer 20 accepts the instruction to cause the manager MFP 30 to execute print.

When the instruction accepting unit 25*a* accepts the instruction to cause the manager MFP 30 to execute print, the job transmission unit 25*b* of the computer 20 transmits the print job according to the instruction, which is accepted by the instruction accepting unit 25*a*, to the manager MFP 30 addressing the usual-print use port number 24*b* stored in the storage unit 24.

When the destination of the print job received by the communication unit 36 is identical to the usual-print use port number 38*c* stored in the storage unit 38, that is, when the communication unit 36 receives the print job addressing the usual-print use port number 38*c*, the print executing unit 39*a* of the manager MFP 30 executes the print job received by the communication unit 36 with the printer 34.

The usual print by the manager MFP 30 is described above. The same applies to the usual print by the client MFP.

The following describes the operations of the image forming system 10 for pull print.

The user can input an instruction to cause the manager MFP 30 to manage the print job for transmission of the print job to the client MFP by the manager MFP 30, namely, the instruction for pull print, to the computer 20 via the operation unit 21 of the computer 20. Specifically, the user inputs an instruction of print to which various print settings, such as the number of print copies, the page aggregation, and the duplex printing, and setting for pull print (private print) with a setting screen 60, which is illustrated in FIG. 8, are performed to the computer 20.

Figure 8:
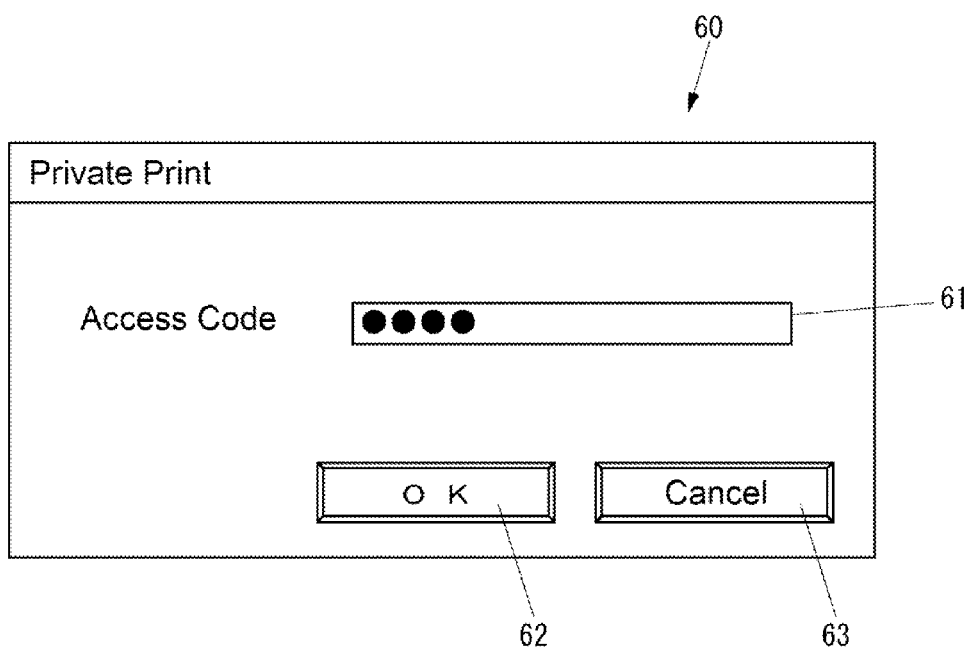
FIG. 8 illustrates one example of a setting screen for a pull print with the printer driver according to the one embodiment.

FIG. 8 illustrates one example of the setting screen 60 for pull print with the printer driver 24*a*.

The setting screen 60, which is illustrated in FIG. 8, includes a text box 61, an OK button 62, and a cancel button 63. To the text box 61, an access code is input. The OK button 62 activates the settings. The cancel button 63 cancels the settings.

Upon the input of the instruction for pull print, the instruction accepting unit 25a of the computer 20 accepts the instruction for pull print.

When the instruction accepting unit 25a accepts the instruction for pull print, the job transmission unit 25b of the computer 20 transmits the print job according to the instruction accepted by the instruction accepting unit 25a to the manager MFP 30 addressing the pull-print use port number 24c stored in the storage unit 24. At this time, the job transmission unit 25b provides the following commands to a printer job language (PJL) of the print job transmitted addressing the pull-print use port number of the manager MFP 30.

@PJL SET HOLDTYPE=PRIVATE
@PJL SET HOLDKEY="5678"
@PJL SET USERNAME="k080701267"

The command on the first line is a command to set a value, "PRIVATE," to a parameter, "HOLDTYPE," and is a command indicating that the pull print has been instructed to the print job.

The command on the second line is a command to set a value, "5678," to a parameter, "HOLDKEY," and is a command indicative of the access code. The value "5678" is an example, and the value is actually a value set in the text box 61 on the setting screen 60.

The command on the third line is a command to set a value, "k080701267," to a parameter, "USERNAME," and is a command for indicating the user name. The value "k080701267" is an example, and this value is actually a use name of the user who has input the instruction of pull print and has logged in to the computer 20.

When the destination of the print job received by the communication unit 36 is identical to the pull-print use port number 38d stored in the storage unit 38, that is, when the communication unit 36 receives the print job addressing the pull-print use port number 38d, the job management unit 39b of the manager MFP 30 manages the print job received by the communication unit 36. Specifically, the job management unit 39b executes the operations illustrated in FIG. 9.

Figure 9:
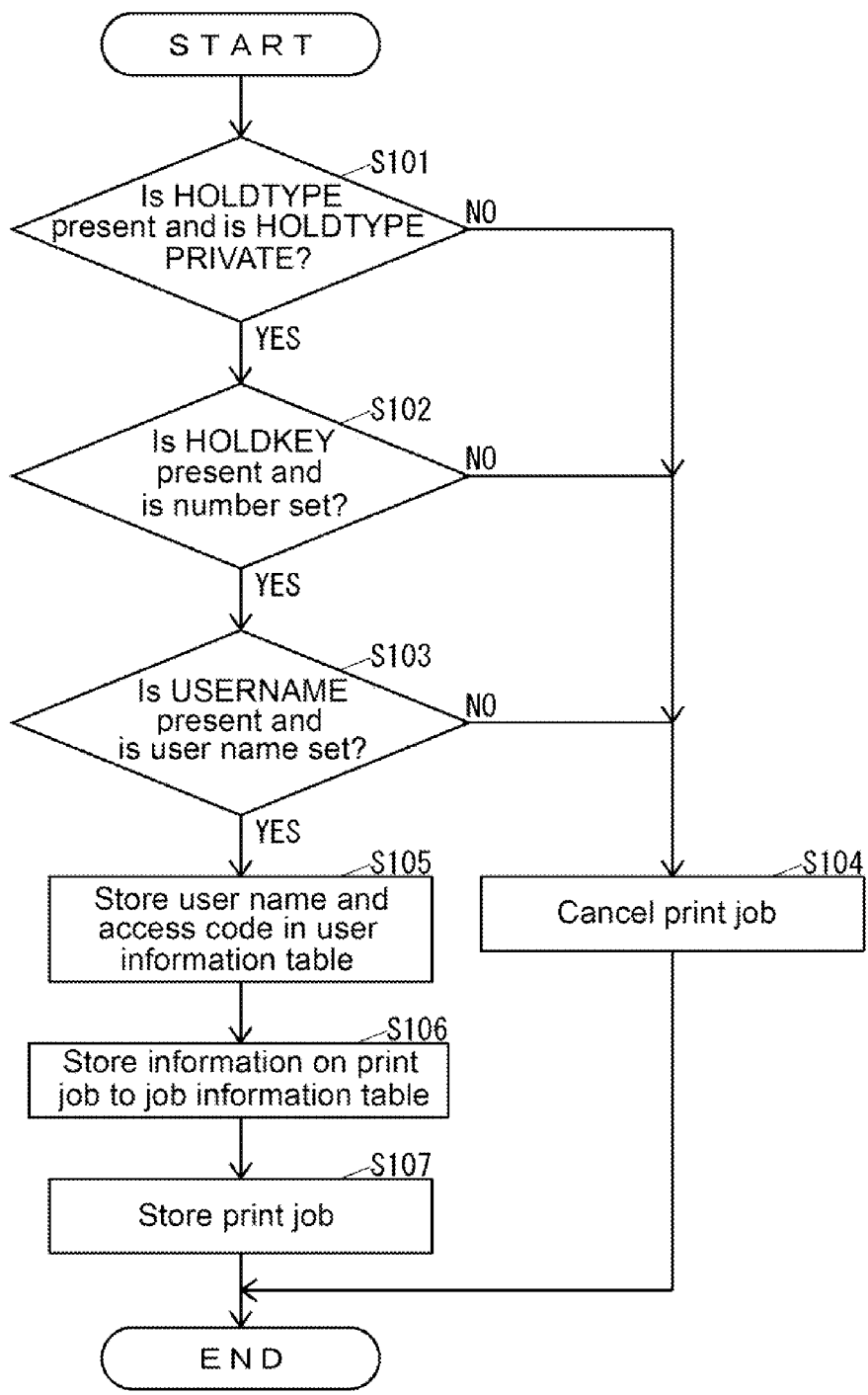
FIG. 9 illustrates operations by the manager MFP according to the one embodiment to control a print job.

FIG. 9 illustrates the operations by the manager MFP 30 to manage the print job.

As illustrated in FIG. 9, the job management unit 39b determines whether the value "PRIVATE" has been set to the parameter "HOLDTYPE" in the command in PJL for the target print job or not (Step S101).

When the job management unit 39b determines that the value "PRIVATE" has been set to the parameter "HOLDTYPE" at Step S101, the job management unit 39b determines whether a number has been set to the parameter "HOLDKEY" in the command in PJL for the target print job or not (Step S102).

When the job management unit 39b determines that that number has been set to the parameter "HOLDKEY" at Step S102, the job management unit 39b determines whether the user name has been set to the parameter "USERNAME" in the command in PJL for the target print job or not (Step S103).

When the job management unit 39b determines that the value "PRIVATE" has not been set to the parameter "HOLDTYPE" at Step S101, determines that the number has not been set to the parameter "HOLDKEY" at Step S102, or determines that the user name has not been set to the parameter "USERNAME" at Step S103, the job management unit 39b cancels the target print job (Step S104) and terminates the operations illustrated in FIG. 9.

When the job management unit 39b determines that the user name has been set to the parameter "USERNAME" at Step S103, the job management unit 39b associates the user name set to the parameter "USERNAME" in the command in PJL for the target print job with the access code set to the parameter "HOLDKEY" as the number in the command in PJL for the target print job, and stores the associated user name and access code in the user information table 38f (Step S105). Specifically, the job management unit 39b determines whether the user information table 38f stores the target user name or not. When the user information table 38f does not store the target user name, the target user name is added to the user information table 38f. Next, the job management unit 39b causes the user information table 38f to store the target access code as an access code made correspond to the target user name. Here, when the access code has already been made correspond to the target user name in the user information table 38f, the access code that has already been made correspond is overwritten by the target access code.

After the process at Step S105, the job management unit 39b stores information on the target print job to the job information table 38g (Step S106). Here, the job management unit 39b may create any job name of the target print job. As one piece of information on the target print job, the job management unit 39b also causes the job information table 38g to store the user name set to the parameter "USERNAME" in the command in PJL for the target print job.

Next, the job management unit 39b stores the target print job in the storage unit 38 as the print job 38e (Step S107) and terminates the operations illustrated in FIG. 9.

When the manager MFP 30 manages the print job as illustrated in FIG. 9, the user can instruct the client MFP 40 to log in to the manager MFP 30 via the operation unit 41 of the client MFP 40. Here, the display unit 42 of the client MFP 40 displays a login screen 70, which is as illustrated in FIG. 10, for login to the manager MFP 30.

Figure 10:
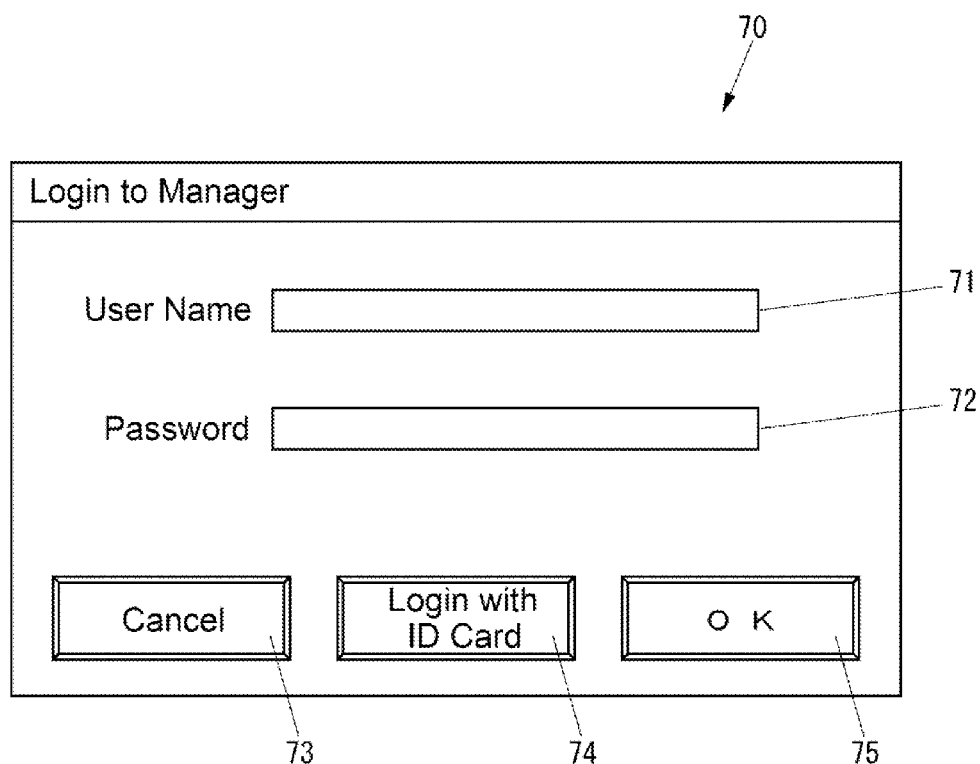
FIG. 10 illustrates one example of a login screen displayed on a display unit according to the one embodiment.

FIG. 10 illustrates one example of the login screen 70.

The login screen 70, which is illustrated in FIG. 10, includes a text box 71 to input a user name, a text box 72 to input a login password, a cancel button 73 to cancel a process, a button 74 for login with an ID card, and an OK button 75 to continue the process.

The user inputs the user name and the password to the text box 71 and the text box 72, respectively and presses the OK button 75. This operation allows the user to instruct the client MFP 40 to log in to the manager MFP 30 using login information. That login information is a combination of the user name, which is input to the text box 71, and the password, which is input to the text box 72. The user sets the ID card to the ID card reader 47 and presses the button 74 in the login screen 70. This operation allows the user to instruct the client MFP 40 to log in to the manager MFP 30 with login information using the ID card information. The ID card information is read from the ID card by the ID card reader 47.

Figure 11:
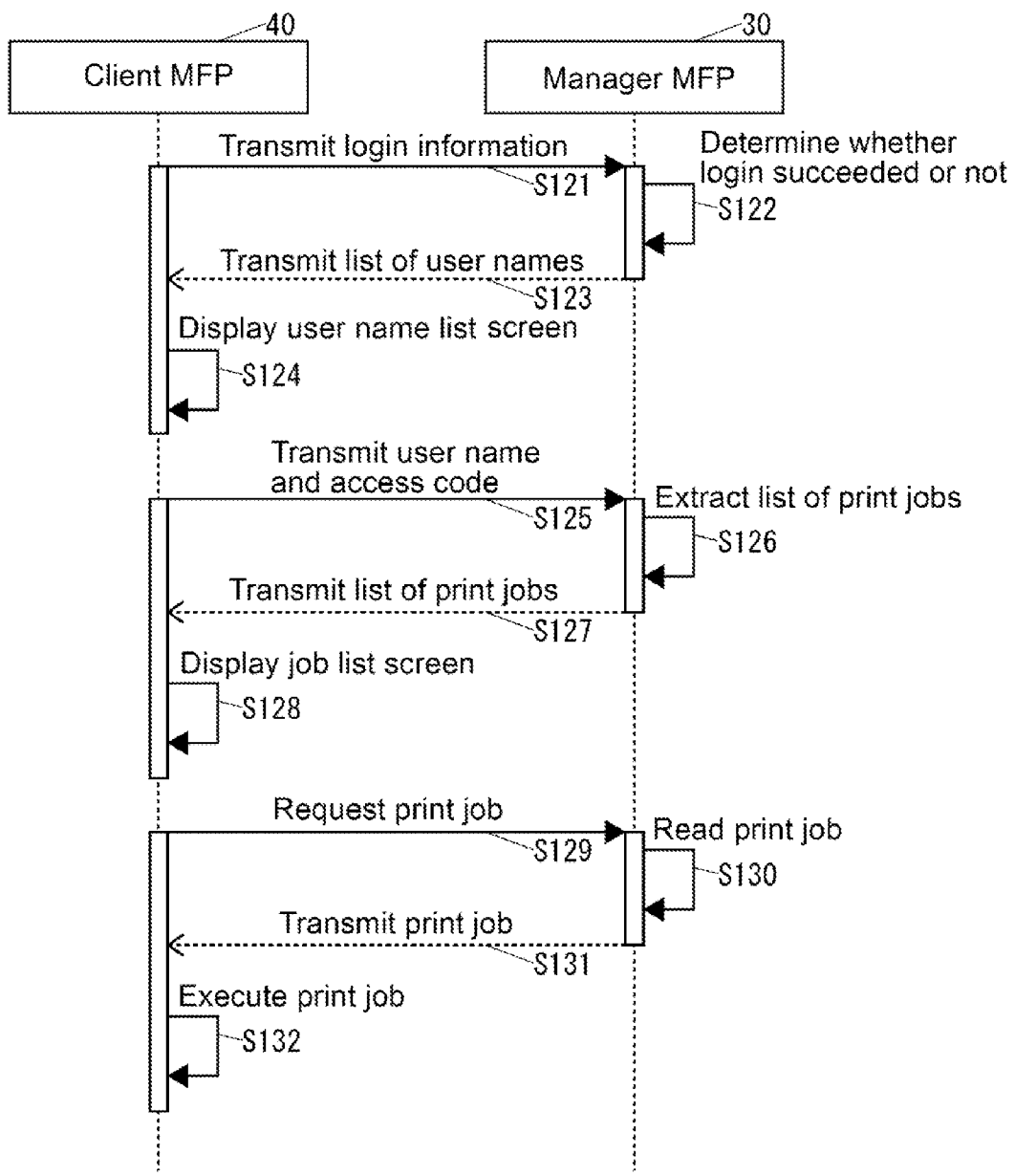
FIG. 11 illustrates operations by the manager MFP and the client MFP according to the one embodiment to execute a print job managed by the manager MFP by the client MFP.

FIG. 11 illustrates the operations by the manager MFP 30 and the client MFP 40 to execute the print job managed by the manager MFP 30 by the client MFP 40.

As illustrated in FIG. 11, when the login to the manager MFP 30 is instructed, the client MFP 40 transmits the login information input by the user to the manager MFP 30 (Step S121). Here, the manager MFP 30 achieves communications with the client MFP 40 using a Web service.

The job management unit 39b of the manager MFP 30 determines whether the user has successfully logged in or not based on the login information transmitted at Step S121 (Step S122). When the job management unit 39b determines that the user has successfully logged in, the job management unit 39b transmits the list of user names stored in the user information table 38f to the client MFP 40 (Step S123).

Figure 12:
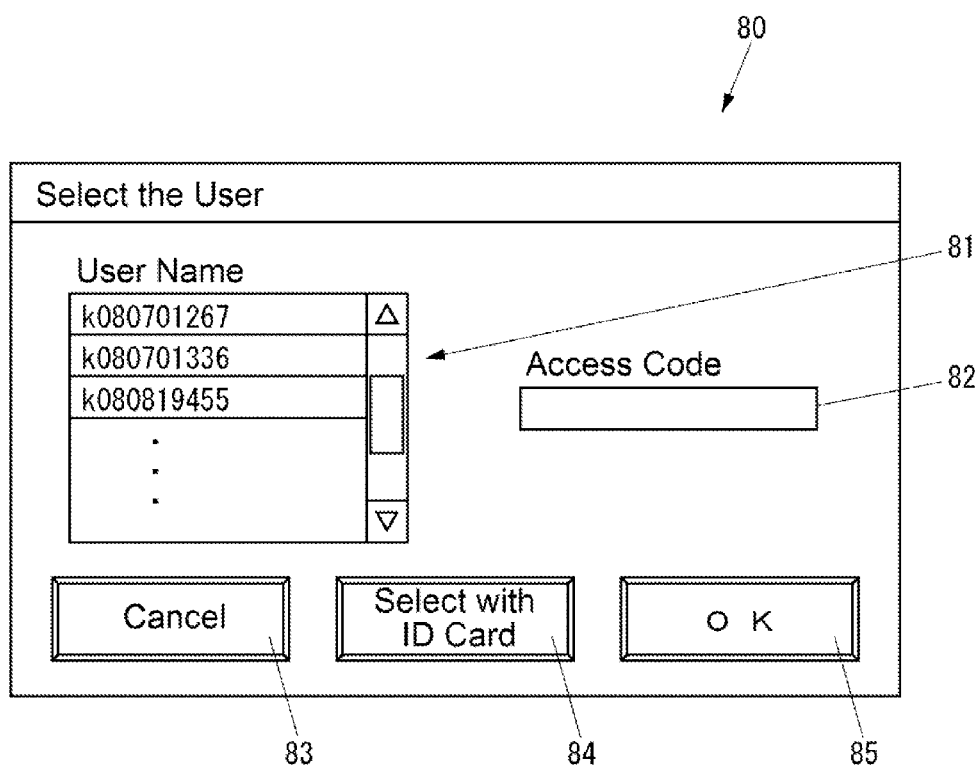
FIG. 12 illustrates one example of a user name list screen displayed on the display unit according to the one embodiment.

When the client MFP 40 receives the list of user names from the manager MFP 30, the client MFP 40 displays a user name list screen 80, which is as illustrated in FIG. 12, on the display unit 42 (Step S124).

FIG. 12 illustrates one example of the user name list screen 80.

The user name list screen 80 illustrated in FIG. 12 includes a user name list area 81, a text box 82 to input the access code, a cancel button 83 to cancel a process, a button 84 to select the user with the ID card, and an OK button 85 to continue the process. The user name list area 81 displays the list of user names received from the manager MFP 30.

On the user name list screen 80, the user can select the user name from the user name list area 81, input an access code corresponding to the user name selected in the user name list area 81 to the text box 82, and press the OK button 85.

The information transmitting unit 49b of the client MFP 40 transmits the combination of the user name, which is selected in the user name list area 81, when the OK button 85 is pressed and the access code, which is input to the text box 82, when the OK button 85 is pressed to the manager MFP 30 (Step S125).

When the manager MFP 30 receives the combination of the user name and the access code, which are transmitted from the client MFP 40, if the user information table 38f has stored the combination of the received user name and access code, the job management unit 39b of the manager MFP 30 extracts the list of print jobs associated to this user name in the job information table 38g (Step S126). Then, the job management unit 39b transmits the list of print jobs extracted at Step S126 to the client MFP 40 (Step S127).

Figure 13:
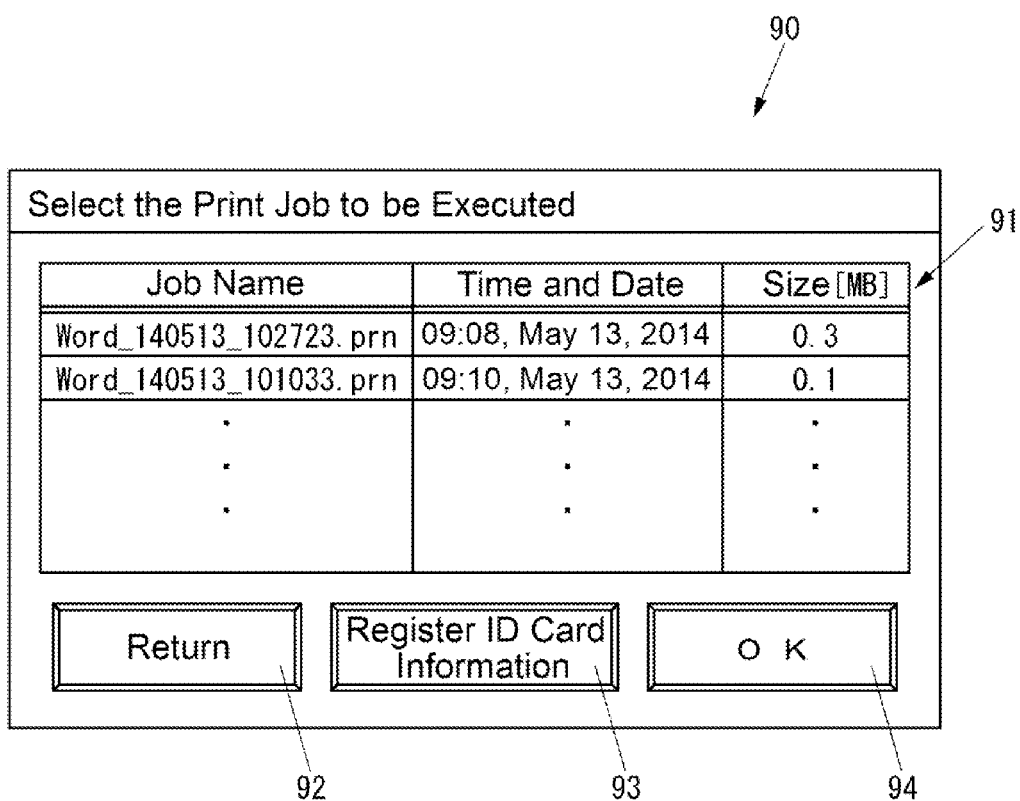
FIG. 13 illustrates one example of a job list screen displayed on the display unit according to the one embodiment.

When the client MFP 40 receives the list of print jobs transmitted from the manager MFP 30, the client MFP 40 displays a job list screen 90, which is as illustrated in FIG. 13, on the display unit 42 (Step S128).

FIG. 13 illustrates one example of the job list screen 90.

The job list screen 90, which is illustrated in FIG. 13, includes a job list area 91, a button 92, a button 93, and an OK button 94. The job list area 91 displays the list of the print jobs received from the manager MFP 30. The button 92 returns the screen to the user name list screen 80. The button 93 registers the ID card information. The OK button 94 continues the process.

The user can select at least one print job from the job list area 91 on the job list screen 90 and press the OK button 94.

At the point of pressing the OK button 94, the client MFP 40 transmits the job name of the print job selected in the job list area 91 to the manager MFP 30 to request the print job to the manager MFP 30 (Step S129).

When the manager MFP 30 receives the job name, which is transmitted from the client MFP 40, the another-apparatus transmitting unit 39c of the manager MFP 30 reads the print job 38e to which the received job name has been given from the storage unit 38 (Step S130) and transmits the read print job to the client MFP 40 (Step S131).

When the client MFP 40 receives the print job transmitted from the manager MFP 30, the pull-print use print executing unit 49c of the client MFP 40 executes the received print job with the printer 44 (Step S132).

The user can register the ID card information on the job list screen 90. Specifically, the user can register the ID card information by setting the ID card to the ID card reader 47 and pressing the button 93 on the job list screen 90.

Figure 14:
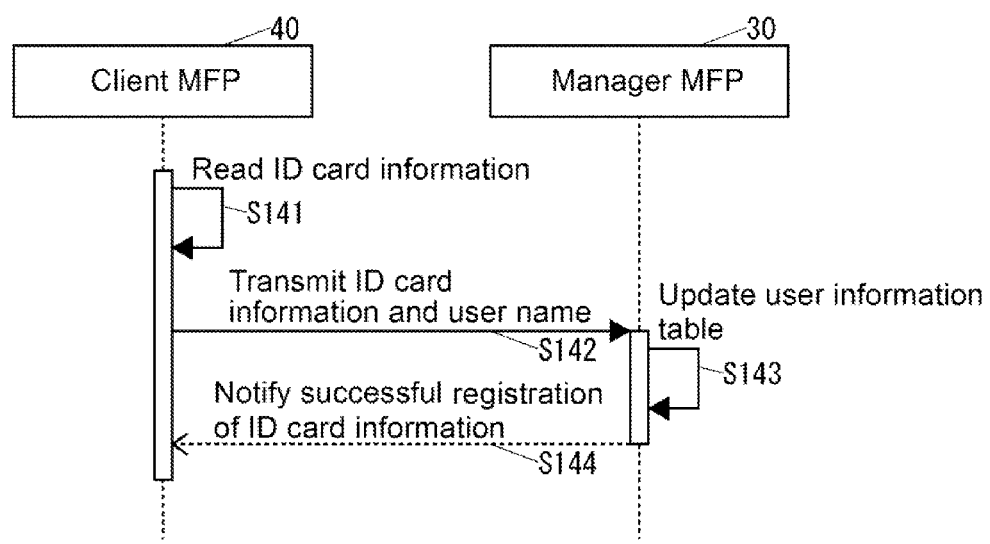
FIG. 14 illustrates the operations by the manager MFP and the client MFP according to the one embodiment to register ID card information.

FIG. 14 illustrates the operations by the manager MFP 30 and the client MFP 40 to register the ID card information.

As illustrated in FIG. 14, when pressing the button 93 on the job list screen 90, the information transmitting unit 49b of the client MFP 40 reads the ID card information from the ID card by the ID card reader 47 (Step S141).

Next, the information transmitting unit 49b transmits the ID card information, which is read at Step S141, to the manager MFP 30 together with the user name selected in the user name list screen 80 when the job list screen 90 is displayed (Step S142).

When the manager MFP 30 receives the combination of the ID card information and the user name from the client MFP 40, the job management unit 39b of the manager MFP 30 updates the user information table 38f with the received ID card information (Step S143). Specifically, the job management unit 39b causes the user information table 38f to store target ID card information as ID card information made correspond to the target user name. Here, when the ID card information has already been made correspond to the target user name in the user information table 38f, the ID card information that has already been made correspond is overwritten by the target ID card information.

The job management unit 39b notifies the client MFP 40 of successful registration of the ID card information (Step S144). If the registration of the ID card information fails for any reason, the job management unit 39b may notify the client MFP 40 of the failure of the registration of the ID card information.

When the manager MFP 30 notifies the client MFP 40 of the successful registration of the ID card information, the display unit 42 may display the successful registration of the ID card information. Similarly, when the manager MFP 30 notifies the client MFP 40 of the failure of registration of the ID card information, the display unit 42 may display the failure of registration of the ID card information.

When the ID card information is registered with the user information table 38f, the user can cause the display unit 42 to display the job list screen 90 by setting the ID card to the ID card reader 47 and pressing the button 84 on the user name list screen 80.

Figure 15:
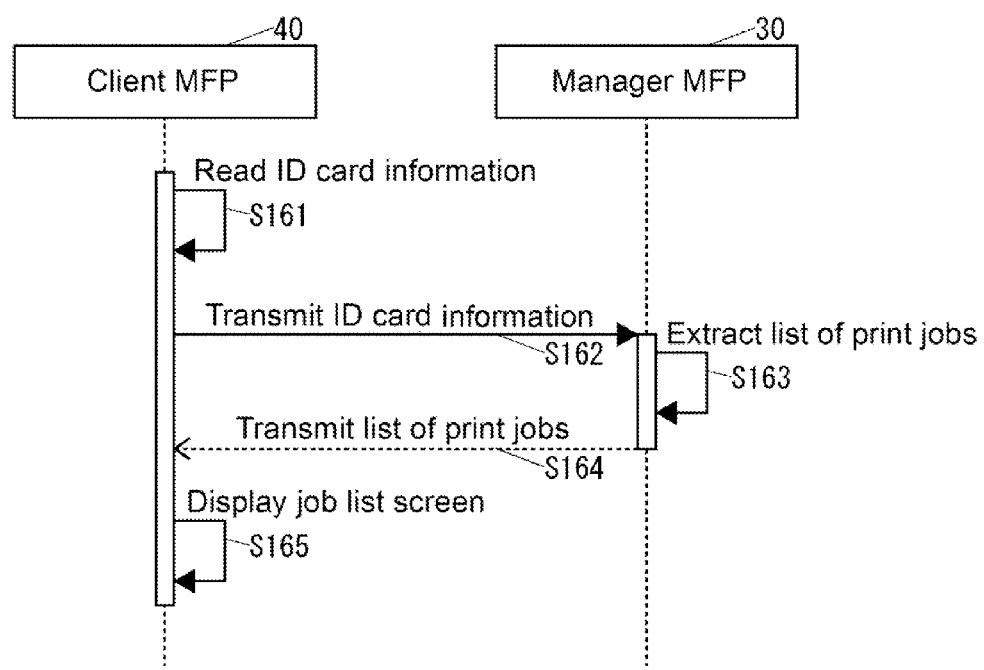
FIG. 15 illustrates the operations by the manager MFP and the client MFP according to the one embodiment to cause the display unit to display the job list screen with an ID card.

FIG. 15 illustrates the operations by the manager MFP 30 and the client MFP 40 to cause the display unit 42 to display the job list screen 90 with the ID card. The processes illustrated in FIG. 15 are executable processes instead of the processes of Step S125 to Step S128 in FIG. 11.

As illustrated in FIG. 15, when pressing the button 84 on the user name list screen 80, the information transmitting unit 49b of the client MFP 40 reads the ID card information from the ID card by the ID card reader 47 (Step S161).

Next, the information transmitting unit 49b transmits the ID card information read at Step S161 to the manager MFP 30 (Step S162).

When the manager MFP 30 receives the ID card information transmitted from the client MFP 40, if the user information table 38f has stored the received ID card information, the job management unit 39b of the manager MFP 30 extracts the list of print jobs associated to the user name made correspond to this ID card information in the job information table 38g (Step S163). Then, the job management unit 39b transmits the list of print jobs extracted at Step S163 to the client MFP 40 (Step S164).

When the client MFP 40 receives the list of print jobs transmitted from the manager MFP 30, the client MFP 40 displays the job list screen 90 on the display unit 42 (Step S165).

As described above, the manager MFP 30 of the image forming system 10 performs the operation to execute the print job and the operation to manage the print jobs for transmission of the print job to the client MFP while switching the operations depending on the port number of the destination for the print job transmitted from the computer 20. Accordingly, the image forming system 10 can achieve the pull print without using the server computer.

With the image forming system 10, the manager MFP 30, which manages the print job transmitted from the computer 20, manages the ID card information transmitted from the client MFP 40. Accordingly, even if the computer 20 transmitting the print job does not include the ID card reader, the pull print using the ID card information can be achieved.

The execution of the print job managed by the manager MFP 30 by the client MFP 40 is described above. However, the operation where the manager MFP 30 executes the print job managed by the manager MFP 30 itself can also be achieved by the similar operation.

The "image forming apparatus" of the disclosure is the manager MFP 30 in the embodiment. However, as long as the apparatus can execute the print job, the apparatus may also be an apparatus other than the MFP, such as a printer-only machine.

Similarly, "another image forming apparatus" of the disclosure is the client MFP in the embodiment. However, as long as the apparatus can execute the print job, the apparatus may also be an apparatus other than the MFP, such as the printer-only machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
   a computer that transmits a print job;
   a manager image forming apparatus that manages the print job transmitted from the computer; and
   a plurality of client image forming apparatuses connected to the manager image forming apparatus and the computer via a network; wherein
   the manager image forming apparatus comprises
      a print device that executes print on a recording medium,
      a communication device that performs communications via the network,
      a print executing circuit that causes the print device to perform the print job addressing a usual-print use port number, received by the communication device,
      a job managing circuit that manages a print job addressing a pull-print use port number, received by the communication device, distinct from the usual-print use port number,
      an another-apparatus transmitting circuit that transmits the print job managed by the job managing circuit to one of the plurality of client image forming apparatuses via the communication device, and
      a storage device that includes a user information table and a job information table, the user information table including i) a user name indicating identification information of a user, and ii) an access code indicating authentication information of the user, for each of the user, and the job information table including i) a job name indicating a name of the print job, and ii) the user name associated with the print job, for each of the print job;
   the computer provides to the image forming apparatus specified commands in a printer job language (PJL) of the print job, when accepting an instruction for transmitting the print job addressing the pull-print use port number, the specified commands including i) a first command having a first parameter that indicates a pull print has been instructed to the print job, ii) a second command having a second parameter that indicates the access code, and iii) a third command having a third parameter that indicates the user name;
   the job management circuit
      cancels the print job, when the job management circuit determines at least one of (i) that a value indicating the pull print has been instructed to the print job has not been set to the first parameter, (ii) that the access code has not been set to the second parameter, and (iii) that the user name has not been set to the third parameter,
      stores i) the user name in the PJL associated with the access code in the PJL in the user information table, and ii) the job name of the print job associated with the user name in the PJL in the job information table, wherein, when the access code has already been made correspond to the target user name in the user information table, the access code that has already been made correspond is overwritten by the target access code,
      transmits via the communication device, when a login has been successful based on login information transmitted from the one of the plurality of client image forming apparatuses, a list of user names stored in the user information table, to the one of the plurality of client image forming apparatuses, and
      transmits via the communication device, when a combination of the selected user name in the list of the user names and the input access code transmitted from the one of the plurality of client image forming apparatuses is stored in the user information table, a list of print jobs associated with the selected user name, to the one of the plurality of client image forming apparatuses;
   the another-apparatus transmitting circuit transmits via the communication device, when receiving the selected job name in the list of the print jobs from the one of the plurality of client image forming apparatuses, the print job that has the selected job name in the job information table, to the one of the plurality of client image forming apparatuses; and
   the one of the plurality of image forming apparatuses performs the print job received from the manager image forming apparatus.

2. The image forming apparatus according to claim 1, wherein:
   the user information table further includes ID card information for each of the user; and
   the job management circuit transmits via the communication device, when the ID card information transmitted from the one of the plurality of client image forming apparatuses is stored in the user information table, the list of the print jobs associated with the user name associated with the ID card information, to the one of the plurality of client image forming apparatuses.

* * * * *